United States Patent [19]

Reed et al.

[11] 4,435,222

[45] Mar. 6, 1984

[54] PROCESS FOR CLEANING METAL SURFACES OF POLY(ARYLENE SULFIDE) DEPOSITS

[75] Inventors: Jerry O. Reed; Timothy W. Johnson, both of Bartlesville, Okla.

[73] Assignee: Phillips Petroleum Company, Bartlesville, Okla.

[21] Appl. No.: 403,435

[22] Filed: Jul. 30, 1982

[51] Int. Cl.$^3$ .............................................. C23G 5/02
[52] U.S. Cl. ........................................... 134/2; 134/3
[58] Field of Search ....................... 134/28, 30, 41, 38, 134/3, 2; 252/174.23

[56] References Cited

U.S. PATENT DOCUMENTS 3,380,951 4/1968 Frey .................................... 524/486

FOREIGN PATENT DOCUMENTS 58-03615 1/1983 Japan .

*Primary Examiner*—S. Leon Bashore, Jr.
*Assistant Examiner*—Karen M. Hastings

[57] ABSTRACT

A process for removing poly(arylene sulfide) deposits from metal surfaces is provided which comprises contacting said deposits with a halogenated cleaning agent followed by contacting the remaining deposits with a solution of a aluminum halide in an aromatic hydrocarbon. In addition, a process for the cleansing of metal parts having poly(arylene sulfide) deposits is provided which comprises contacting the parts in a manner as described immediately above, and thereafter contacting the metal parts with a lower alkyl alcohol, washing the metal part with $H_2O$, drying the metal part, followed by treatment of the dried part with concentrated $HNO_3$.

21 Claims, No Drawings

PROCESS FOR CLEANING METAL SURFACES OF POLY(ARYLENE SULFIDE) DEPOSITS

This invention relates to a process for cleaning metal surfaces containing poly(arylene sufide) based deposits. In addition, this invention relates to a process for cleaning metal surfaces to remove not only poly(arylene sulfide) deposits but other contaminants as well.

In the production of poly(arylene sulfide) polymers various impurities such as polymer gel and inorganic materials are sometimes present in the polymer and can deposit on the surfaces of the production equipment. In addition, deposits derived from the polymer can also form during subsequent processing of the polymer, such as in synthetic fiber production. Thus the machine parts utilized in processing the produced polymer which have poly(arylene sulfide) deposits and/or other impurities must be cleaned for re-use. Such parts include spinnerettes, dies, pack parts, and filters.

In the past such poly(arylene sulfide) deposits have been removed mechanically, but the job is tedious and time consuming due to the complexity of the equipment. Also, attempts to remove such deposits by "burn out" procedures where the metal parts containing the deposits are placed in a forced air furnace and extreme heat applied, have been made. However, this "burn out" procedure is not suitable for removing such deposits from metal surfaces since the burn out caused corrosion on the metal surface. Therefore, a process which will readily remove such deposits without having a corrosive or other deleterious effect on processing equipment is desirable.

In addition to the poly(arylene sulfide) deposits, contaminants such as metal oxides and calcium and magnesium salts form on the metal surfaces. Their removal is also desirable in order to give a clean metal surface.

It is therefore an object of this invention to provide a process for removing deposits derived from poly(arylene sulfides) from metal surfaces. It is a further object of this invention to provide a process for the cleaning of metal parts having poly(arylene sulfide) deposits thereon.

Other aspects, objects, and the several advantages of the present invention will become apparent from this specification and the claims.

In accordance with the present invention we have discovered that poly(arylene sulfide) deposits on metal surfaces can be removed by contacting the deposits with at least one halogenated aromatic cleaning agent under conditions of time and temperature sufficient to effect removal of the deposits; and thereafter contacting the remaining deposits with a solution consisting essentially of at least one aluminum halide in an aromatic hydrocarbon having from about 6 to about 12 carbon atoms per molecule at a temperature and for a time sufficient to effect removal of any remaining deposits.

In accordance with another embodiment of the present invention, we have discovered that metal parts having poly(arylene sufide) deposits may be cleaned by contacting the parts in the manner in accordance with the first embodiment of the invention as described supra, and thereafter contacting the metal part with a lower alkyl alcohol, washing the metal part with water, drying the part and thereafter contacting the dried part with concentrated $HNO_3$.

The term "poly(arylene sulfide) polymer" as used in this specification is intended to include polymers of the type which are prepared as described in U.S. Pat. No. 3,354,129 and U.S. Pat. No. 3,919,177. As disclosed in U.S. Pat. No. 3,354,129, these polymers can be prepared by reacting a polyhalo-substituted cyclic compound containing unsaturation between adjacent rings and an alkali metal sulfide in a polar organic compound. The resulting polymer contains the cyclic structure of the polyhalo-substituted compound coupled in repeating units through a sulfur atom. The polymers which are preferred for use in this invention, because of their frequent occurrence in polymer production and processing, are those polymers having the repeating unit —R—S— where R is phenylene, biphenylene, naphthylene, biphenylene ether, or a lower alkyl-substituted derivative thereof. By "lower alkyl" is meant alkyl groups having one to six carbon atoms such as methyl, propyl, isobutyl, n-hexyl, etc. Polymer can also be made according to a process utilizing a p-dihalobenzene, an alkali metal sulfide, an organic amide, and an alkali metal carboxylate as in U.S. Pat. No. 3,919,177.

In the process of the present invention, poly(arylene sulfide) deposits on metal surfaces are first contacted with at least one halogenated aromatic agent. The term "halogenated aromatic cleaning agent" as used herein is intended to include those compounds of the formula $R'X_n$ wherein $R'$ is either biphenyl or naphthalene, X is one of Br, Cl, or I, and n is either 1 or 2. Examples of cleaning agents of the formula $R'X_n$ which can be utilized in the process of the present invention include:

1-chloronaphthalene
2-bromonaphthalene
2-bromobiphenyl
3-iodobiphenyl
4-chlorobiphenyl
1,3-dichloronaphthalene
2,7-dibromonaphthalene
4'4'-dichlorobiphenyl
and mixtures thereof.

Whatever chemical of the formula $R'X_n$ is used as the cleaning agent should exhibit some solubility for the particular poly(arylene sulfide) polymer being removed. Such a cleaning agent should have preferably a boiling point greater than 200° C. as their use at such a temperature has exhibited enhanced cleaning results.

The contact between the halogenated aromatic compound and the deposit is preferably carried out at a temperature from about 200° C. to about 400° C. for about 0.5 to about 24 hours.

Subsequently, any remaining deposits on the metal surface should be contacted with a solution, preferably of from about 0.1 to about 20.0 weight percent, of at least one aluminum halide dissolved in an aromatic hydrocarbon at a temperature and for a time sufficient to remove said deposits. Generally, the contact should be at a temperature from 60° C. up to the boiling point of said aromatic hydrocarbon for a period of time from about 0.5 hours to about 24 hours.

Preferably, the aluminum halide utilized in the process of this invention is of the formula $AlX_3$ wherein X represents one of either Cl, Br, or I. Aluminum chloride is the presently preferred metal halide.

Examples of aromatic hydrocarbons that can be used include benzene, toluene (preferably preferred), o-, m-, and p-xylene and combinations thereof, mesitylene, p-cymene, biphenyl, naphthalene, the three isomeric tetrachlorobenzenes (1,2,3,4; 1,2,3,5; 1,2,4,5), the three isomeric trichlorobenzenes (1,2,3; 1,2,4; 1,3,5), the o-, m-, and p-dibromobenzenes, 2,5-dibromotoluene, the o-, m-, and p-dichlorobenzenes, o-, m-, and p-chlorotoluenes, and mixtures thereof.

In a preferred embodiment of the present invention, the above treated metal parts are subsequently contacted with a lower alkyl ($C_1$ to $C_5$) alcohol, such as methanol, to remove the aromatic hydrocarbon from the metal surface.

In still another preferred embodiment of this invention, the alcohol-treated metal surfaces are water washed, dried, and then contacted with concentrated $NHO_3$ to remove any contaminants, such as metal oxides and Ca and Mg salts remaining on the metal surfaces.

In another embodiment of the present invention, metal parts having poly(arylene sulfide) deposits thereon may be cleaned by contacting the deposits with at least one cleaning agent as described in the first embodiment and thereafter contacting the metal part with a solution comprising at least one aluminum halide in at least one aromatic hydrocarbon as described in the first embodiment of the present invention, and thereafter contacting said metal part with a lower alkyl alcohol, washing said metal part with water, drying the part, and thereafter contacting the dried part with concentrated nitric acid, water washed and dried.

The following examples illustrate the present invention.

EXAMPLE I

Poly(phenylene sulfide) (PPS) having a melt flow between 200 and 400 measured at 315° C./5 Kg was extruded at about 300° C. through a screen-pack comprised of 4 stainless steel screens (1.56 inches diameter) 40/80/200/X13L mesh size placed next to one another. After several hours extrusion, the screens were removed and immersed in about 250 milliliters of 1-chloronaphthalene at 250° C. for 2 hours. The screens were removed from the solution, rinsed with water and then acetone and air dried. At this point there was a small gelatinous layer on the screen surface. The screens were then immersed in a solution of 1 weight percent $AlCl_3$ dissolved in toluene and heated at 80° C. for 4 hours. At this point the screens looked clean. Even so, the screens were water soaked at 25° C. for 1 hour, air dried and treated with concentrated $HNO_3$ for about 30 minutes at 25° C. to remove remaining contaminants. The treated screens were again water washed and dried. The screens were now essentially clean with a shiny appearance. The surface did not look corroded. The cleaning process was repeated except the first step of soaking in 1-chloronaphthalene was omitted. There was no corrosion but there was no significant cleaning either. Cleaning the screen-pack by a commercially accepted burn-off method where the article is heated at 425° C. did result in satisfactorily cleaning the screens but there was significant corrosion such as to render the burn-off method impractical with expensive metal objects. These results can best be seen in Table I.

TABLE I

Cleaning PPS-Contaminant From Stainless Steel Screens[a]

| Cleaning Method | Temp. °C. | Hours | Results |
|---|---|---|---|
| Control: | | | |
| 1. Burn-Off | 425 | — | Clean but considerable corrosion |
| 2. $AlCl_3$-Toluene[b] | 80 | 6 | No corrosion but incomplete cleaning |
| Invention: | | | |

TABLE I-continued

Cleaning PPS-Contaminant From Stainless Steel Screens[a]

| Cleaning Method | Temp. °C. | Hours | Results |
|---|---|---|---|
| 3. 2-Step | | | |
| a. 1-chloronaphthalene | 250 | 2 | Fairly clean but leaves a gelatinous layer |
| b. $AlCl_3$-Toluene[b] | 80 | 4 | Very clean, no corrosion |

[a] Screen-pack, 1.56 inches diameter, 40/80/200/X13L mesh size
[b] 1 weight percent dissolved in toluene.

EXAMPLE II

Poly(phenylene sulfide) (PPS) as described in Example I was extruded at about 300° C. through a filter cartridge commonly used in fiber spinning operations. The filter cartridge (identified as Dynalloy X13L) consisted of a 7.5 inches × 1.55 inches. O.D. cylinder with an inner and outer stainless steel support screen (equivalent to about a 40 mesh size) and an inner fine filter stainless steel mat (46 micron filter rating). After several hours PPS extrusion operation, the filter cartridge was removed and cleaned as in Example 1, namely, 16 hours at 250° C. in 1-chloronaphthalene, 2 hours methyl alcohol soak-wash, dried and 5 hours in a 1 weight percent $AlCl_3$ in toluene solution. At the end of this cleaning power, the metal screen surfaces were extremely clean.

Reasonable variations and modifications are possible within the scope of the foregoing disclosure without departing from the spirit thereof.

We claim:
1. A process for removing poly(arylene sulfide) deposits from metal surfaces comprising:
    (a) contacting said poly(arylene sulfide) deposits with at least one halogenated aromatic cleaning agent under conditions of temperature and time sufficient to remove said deposits; and
    (b) thereafter contacting the remaining deposits with a solution comprising at least one aluminum halide in an aromatic hydrocarbon having from about 6 to about 12 carbon atoms per molecule at a time and for a temperature sufficient to remove said deposits.

2. A process according to claim 1 wherein said poly(arylene sulfide) is poly(phenylene sulfide).

3. A process according to claim 1 wherein said halogenated aromatic cleaning agent is of the formula $R'X_n$ wherein R' is either naphthalene or biphenyl, X is one of Br, Cl, or I, and n is 1 or 2.

4. A process according to claim 3 wherein said aromatic cleaning agent is at least one of the group consisting of:
    1-chloronaphthalene
    2-bromonaphthalene
    2-bromobiphenyl
    3-iodobiphenyl
    4-chlorobiphenyl
    1,3-dichloronaphthalene
    2,7-dibromonaphthalene
    4'4'-dichlorobiphenyl 5. A process according to claim 4 wherein said cleaning agent is 1-chloronaphthalene.

6. A process as in claim 5 wherein said contacting between said deposit and 1-chloronaphthalene is carried out at a temperature of from about 200° C. to about 400° C. from about 0.5 to about 24 hours.

7. A process according to claim 1 wherein said aluminum halide is of the formula $AlX_3$ where X is one of Br, Cl, or I.

8. A process according to claim 7 wherein said aluminum halide is aluminum trichloride.

9. A process according to claim 8 wherein said aluminum trichloride is present in an amount from about 0.1 to about 20.0 weight percent in toluene.

10. A process according to claim 1 wherein said contacting between said remaining deposits and said aluminum halide in said aromatic hydrocarbon occurs at a temperature from about 60° C. up to the boiling point of said aromatic hydrocarbon for a period of time from about 0.5 hours to about 24 hours.

11. A process as in claim 1 wherein said metal surfaces are subsequently washed with water, dried, and then contacted with concentrated $HNO_3$, washed with water and dried.

12. A process for cleaning metal parts having poly(arylene sulfide) deposits thereon comprising:
   (a) contacting said poly(arylene sulfide) deposits with at least one halogenated aromatic cleaning agent under conditions of temperature and time sufficient to remove said deposits; and
   (b) thereafter contacting the remaining deposits with a solution comprising at least one aluminum halide in an aromatic hydrocarbon having from about 6 to about 12 carbon atoms per molecule at a temperature and for a time sufficient to remove said deposits;
   (c) thereafter contacting said metal part with a lower alkyl alcohol;
   (d) washing the metal part with water;
   (e) drying the metal part; and
   (f) contacting the dried metal part with concentrated $HNO_3$, washed with water and dried.

13. A process according to claim 12 wherein said poly(arylene sulfide) is poly(phenylene sulfide).

14. A process according to claim 12 wherein said halogenated aromatic cleaning agent is of the formula $R'X_n$ wherein R' is either naphthalene or biphenyl, X is one of Br, Cl, or I, and n is 1 or 2.

15. A process according to claim 14 wherein said aromatic cleaning agent is at least one of the group consisting of:
   1-chloronaphthalene
   2-bromonaphthalene
   2-bromobiphenyl
   3-iodobiphenyl
   4-chlorobiphenyl
   1,3-dichloronaphthalene
   2,7-dibromonaphthalene
   4'4'-dichlorobiphenyl 16. A process according to claim 15 wherein said cleaning agent is 1-chloronaphthalene.

17. A process as in claim 16 wherein said contacting between said deposit and 1-chloronaphthalene is carried out at a temperature of from about 200° C. to about 400° C. for about 0.5 to about 24 hours.

18. A process according to claim 12 wherein said aluminum halide is of the formula $AlX_3$ where X is one of Br, Cl, or I.

19. A process according to claim 18 wherein said aluminum halide is aluminum trichloride.

20. A process according to claim 19 wherein said aluminum trichloride is present in an amount from about 0.1 to about 20.0 weight percent in toluene.

21. A process according to claim 12 wherein said contacting between said remaining deposits and said aluminum halide in said aromatic hydrocarbon occurs at a temperature from about 60° C. up to the boiling point of said aromatic hydrocarbon for a period of time from about 0.5 hours to about 24 hours.

* * * * *